N. Pullman,
Horse Bonnet,
Nº 18,300. Patented Sep. 29, 1857.
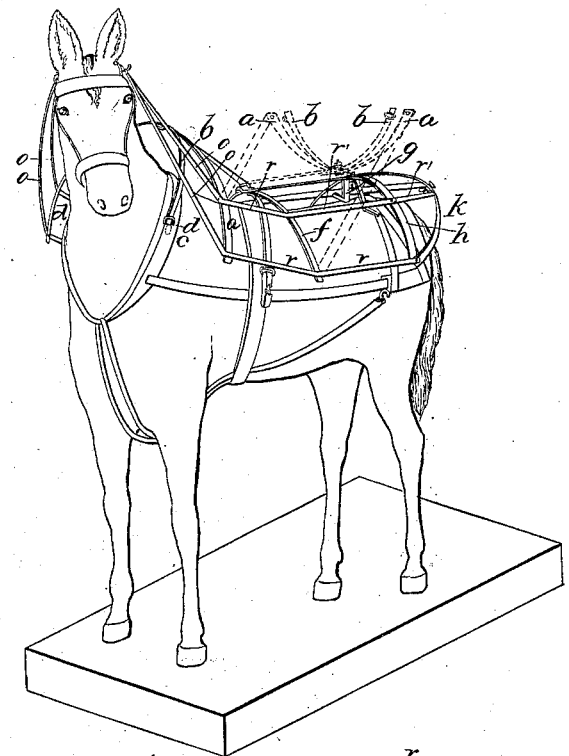
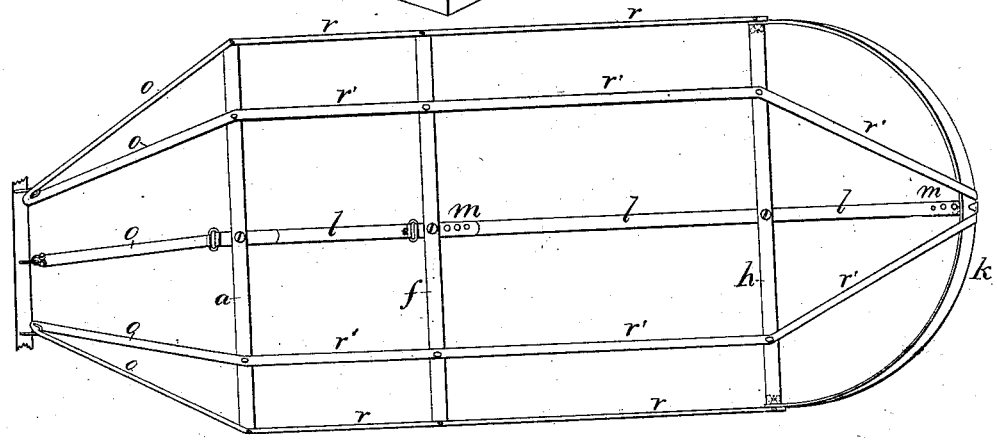

UNITED STATES PATENT OFFICE.

N. PULLMAN, OF NEW OREGON, IOWA.

AWNING-FRAME FOR HORSES ATTACHABLE TO HARNESS.

Specification of Letters Patent No. 18,300, dated September 29, 1857.

*To all whom it may concern:*

Be it known that I, N. PULLMAN, of New Oregon, in the county of Howard and State of Iowa, have invented a new and useful Awning-Frame for Draft-Horses, of which the following is a full, clear, and exact description, reference being had to the accompanying drawing, forming part of this specification, in which—

Figure 1, represents a perspective view of a horse in harness with my improved awning frame attached to and arranged in connection with the harness, and showing also, in red lines, the shoulder rib bent back in position for removing the frame with the harness, and Fig. 2, represents a plan of the frame and harness united.

It has been considered a desideratum to devise some effective method for the protection of horses and other animals, while in harness, from the oppressive heat of the sun and the annoyance of insects during the hot season and at the same time to admit a free circulation of air beneath the covering.

My invention for effecting this object consists first in connecting the front or shoulder bow of the frame with the back bow, by means of a flexible joint, which admits of the front bow being turned back when disengaged from the collar, so that the frame can be removed with the other parts of the harness without being further disconnected; secured in connecting the front row with the bridle by means of flexible bands which while they support the awning and raise it above the horse's neck do not restrain the movement of that part of the body.

The accompanying drawing represents my improved awning frame adjusted upon a horse and shows the manner in which it is arranged in connection with the harness.

This frame consists of a series of metallic ribs connected with each other and attached to the harness so as to afford support for any of the various descriptions of covers that are used to protect horses or other animals of draft from sun, rain or insects, and which it raises above the animal so as to admit a free circulation of air about him.

The front or shoulder rib or bow (*a*) is connected to the collar of the harness by a bow (*b*) which is bent over the top of the collar and its ends received in sockets (*c*) in the sides, and held in place by straps which pass through eyes (*d*) near the ends of the bow. To the top of this bow (*b*) the center of the shoulder rib (*a*) is attached, which raises it above the collar and the neck of the horse, and its ends are bent down so as to approach within a short distance of the sides of the collar. The back rib (*f*) is connected with the saddle of the harness in the same manner as the shoulder rib is connected with the collar, and forms a bow which extends partially around the saddle about half-way down the horse's side, but does not come in contact with him.

A bracket (*g*) is attached to the crupper strap at the point where the breeching straps meet and forms a support for the loin rib (*h*), raising it above the horse. This rib is bent down so as to be free and not touch the sides of the horse, and extends as low as the back-rib (*f*). To the ends of the loin rib (*h*), are pivoted the ends of the crupper rib (*k*) which arches over the rump of the horse, extending back to the croup, and is held in this position by a central rib (*l*) which extends from the shoulder to the crupper rib, and to which all the intermediate ribs are attached. The central rib (*l*) is jointed at (*e*) just in front of the back rib so as to allow the shoulder rib, when released from the collar, to be turned back in order that the frame may be removed with the remainder of the harness without disengaging its other parts. A series of holes (*m*) are made through the central rib just in rear of the back rib and in front of the crupper rib in order to adjust the length of the frame to harnesses of different size.

A series of straps (*o*) of elastic webbing are attached to the shoulder rib and extend to the head piece of the bridle, thus forming a support for that portion of the covering over the neck of the horse and keeping it from coming in contact with him, still allowing him free movement of the head and neck. These straps, instead of being connected to the head piece of the bridle may be attached to a rib bowing out over the forehead of the horse and to a bow passing between the ears and over the crest, which is attached at one end to the forehead bow; thus supporting the awning over the horse's head without allowing it to touch him.

Two rows (*r*, *r'*) of elastic webbing extend along and are attached to the sides of the ribs by means of buttons or in any other convenient manner. One of these rows (*r*) is at the lower end and the other (*r'*) about half way up the sides of the ribs and serve to retain the ribs in place as well as to support a covering which is thrown over them.

Any description of covering may be used with this frame, to protect the horse, as a netting to protect him against insects; a linen cloth with a netting over its lower edge to protect him from the sun or a waterproof cloth to protect him from rain. This covering rests upon the frame, extending down the sides a convenient distance and is brought up over the neck and head of the horse, if desired. Being raised above and kept off from the horse by the frame, the covering, of whatever material it may be, does not prevent a free circulation of air between it and the body of the horse, thus affording him protection without heating him by its contact.

I do not confine myself to the precise arrangement of the parts forming the frame or the manner in which they are connected with the harness, my invention being, in these particulars, susceptible of various modifications according to the circumstances in which it is used.

Having thus described my new awning frame for draft horses what I claim therein as new and desire to secure by Letters Patent is—

1. Arranging the frame for the support of an awning over draft horses with a flexible joint, so that it can be folded back from the head and neck of the horse and removed with the harness as described.

2. Connecting the front bow with the bridle by means of flexible bands for the purpose set forth.

In testimony whereof I have subscribed my name.

N. PULLMAN.

Witnesses:
F. SOUTHGATE SMITH,
A. ROTHWELL.